United States Patent
Hirano et al.

(10) Patent No.: US 7,230,800 B2
(45) Date of Patent: Jun. 12, 2007

(54) MICROACTUATOR FOR A HARD DISK DRIVE WITH AN INTEGRATED GIMBAL FUNCTION

(75) Inventors: Toshiki Hirano, San Jose, CA (US); Ullal Vasant Nayak, San Jose, CA (US); Henry Hung Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 456 days.

(21) Appl. No.: 10/627,096

(22) Filed: Jul. 24, 2003

(65) Prior Publication Data

US 2005/0018359 A1 Jan. 27, 2005

(51) Int. Cl.
G11B 5/596 (2006.01)
G11B 5/48 (2006.01)
(52) U.S. Cl. .................... 360/294.3; 360/245.6
(58) Field of Classification Search ............. 360/294.3, 360/294.6, 294.7, 245.6
See application file for complete search history.

(56) References Cited

U.S. PATENT DOCUMENTS

| 5,657,188 | A | * | 8/1997 | Jurgenson et al. ....... 360/294.3 |
| 5,982,585 | A | | 11/1999 | Fan et al. |
| 6,069,771 | A | * | 5/2000 | Boutaghou et al. ...... 360/294.4 |
| 6,078,473 | A | * | 6/2000 | Crane et al. ............. 360/294.3 |
| 6,246,552 | B1 | | 6/2001 | Soeno et al. ............. 360/294.4 |
| 6,614,628 | B2 | * | 9/2003 | Crane et al. ............. 360/294.5 |
| 6,621,661 | B1 | * | 9/2003 | Ichikawa et al. ........ 360/234.5 |
| 6,624,981 | B1 | * | 9/2003 | Vigna ...................... 360/294.3 |
| 7,149,060 | B2 | * | 12/2006 | Yang et al. .............. 360/294.3 |
| 2001/0053050 | A1 | * | 12/2001 | Crane et al. ............. 360/294.3 |
| 2005/0207055 | A1 | * | 9/2005 | Oh et al. ....................... 360/75 |
| 2006/0285256 | A1 | * | 12/2006 | Hirano et al. ............ 360/294.3 |

* cited by examiner

Primary Examiner—Brian E. Miller
(74) Attorney, Agent, or Firm—Joseph P. Curtin; Eric Proul; Duke Amaniampong

(57) ABSTRACT

A micro-fabricated chip having a stationary structure and a movable structure with a gimbal structure allows pitch and roll motion of the movable structure with respect to the stationary structure. One embodiment of the gimbal structure includes a dimple surface making a rolling-type contact with the stationary structure, and a center bar and a plurality of bar members. An alternative embodiment of the gimbal structure includes a plurality of torsion bar members. Another alternative embodiment of the gimbal structure includes a plurality of flexible members. The micro-fabricated chip can be a passive chip structure or, alternatively, a microactuator having a movable structure that moves in a rotational direction or a translational direction with respect to the stationary structure.

12 Claims, 9 Drawing Sheets

MICROACTUATOR FOR A HARD DISK DRIVE WITH AN INTEGRATED GIMBAL FUNCTION

BACKGROUND OF THE INVENTION

1. Field of the Invention

The present invention relates to the field of disk drives. In particular, the present invention relates to a microactuator for a disk drive that reduces off-track motion of a read/write element.

2. Description of the Related Art

FIG. 1 shows an exemplary high-RPM hard disk drive (HDD) 100 having a magnetic read/write head (or a recording slider) 101 that includes, for example, a tunnel-valve read sensor, that is positioned over a selected track on a magnetic disk 102 using, for example, a two-stage servo system for reading data stored on disk 102. The two-stage servo system includes a voice-coil motor (VCM) 104 for coarse positioning a read/write head suspension 105 and may include a microactuator, or micropositioner, for fine positioning read/write head 101 over the selected track. As used herein, a microactuator (or a micropositioner) is a small actuator that is placed between a suspension and a slider, and moves the slider relative to the suspension.

FIG. 2 depicts a conventional suspension and microactuator arrangement 200. Suspension and microactuator 200 includes a suspension 201, a microactuator 205 and a slider 209. Suspension 201 includes a load beam 202, a dimple 203 and a flexure 204. Suspension 201 imparts a loading force (gram-load) to slider 209. Suspension 201 also provides pitch and roll freedom of motion to the parts attached to suspension 201 by using dimple 203, which is a hemispheric-shaped bump that is made on load-beam 202 and makes a point contact to flexure 204. Flexure 204 is designed to have an extremely low stiffness in roll and pitch direction, and to have an accurately defined free-state both in roll and pitch directions, usually referred to as Pitch Static Attitude (PSA) and Roll Static Attitude (RSA).

Microactuator 205 includes a substrate 206, a microactuator structure 207, and at least one flexure element 208. Substrate 206 is the stationary structure of microactuator 205. Microactuator structure 207 is the movable structure of microactuator 205. Microactuator 205 is usually designed to move horizontally (either rotational or translational) so that the position of slider 209 attached to microactuator 205 can be changed. Microactuator 205 must be designed to have very high stiffness in the z-axis direction and in the pitch/roll direction. These requirements are usually fulfilled by designing a spring structure 208 inside microactuator 205 that is especially anisotropic.

Slider 209 includes a read/write element 210 and is identical to the sliders that are typically used in non-microactuator-type HDDs.

One problem associated with conventional microactuators is that external forces, such as airflow, cause movement of the microactuator in the roll directions, thereby causing read/write element tracking inaccuracies. FIG. 3 depicts movement of microactuator 200 in roll directions 311 under the influence of external forces, such as airflow, as microactuator 200 moves over disk 312. Movement in roll directions 311 causes tracking inaccuracies, as depicted by arrow 313.

Another problem associated with conventional microactuators is that the electrical connections between a suspension and a microactuator are particularly difficult to make. There are two conventional ways for making the electrical connection. First, a bent-lead connection technique can be used, or second, a sidewall-bonding-pad connection technique can be used.

FIG. 4 depicts a conventional bent-lead connection technique for making an electrical connection between a conventional microactuator and a suspension. The microactuator structural arrangement shown in FIG. 4 corresponds to the suspension and microactuator structural arrangements shown in FIGS. 2 and 3. A dimple 403 is formed on a suspension 401 and makes a point contact to a flexure (not shown in FIG. 4). A microactuator 405 is attached to the flexure. A slider 409 is attached to microactuator 405. A bent lead 415 is electrically connected to a solder ball 416 and a bonding pad 417 to microactuator 405. Another solder ball 418 is shown for one of the connections to read/write head (not shown in FIG. 4) on slider 409 for another bent-lead connection that is not visible in FIG. 4.

The problems associated with a bent-lead connection technique includes that a bent-lead suspension is expensive and difficult to make. It is also difficult to control PSA and RSA after the terminations are made. Further, the solder-bump connections must be made from the opposite side and the terminations cannot be formed from leading-edge side of the microactuator and slider otherwise pitch stiffness becomes too high.

FIG. 5 depicts a conventional sidewall-bonding-pad connection technique for making an electrical connection between a conventional microactuator and a suspension. The microactuator structural arrangement shown in FIG. 5 also corresponds to the microactuator structural arrangements shown in FIGS. 2 and 3. A dimple 503 is formed on a suspension 501 and makes a point contact to a flexure (not shown in FIG. 5). A microactuator 505 is attached to the flexure. A slider 509 is attached to microactuator 505. A side-wall-bonding pad 515 is electrically connected through a solder ball 516 to microactuator 505. Another solder ball 518 is shown for one of the connections to read/write head (not shown in FIG. 5) on slider 509 for another side-wall bonding pad connection that is not visible in FIG. 5.

The problems associated with a sidewall-bonding-pad connection technique includes that it is extremely difficult to make bonding pads on the sidewall of a microactuator.

There is a difficulty in controlling PSA/RSA and dimple-contact position that is commonly experiences with conventional non-microactuator Head Gimbal Assemblies (HGAs). Currently, the PSA/RSA of a suspension and dimple-contact position must be controlled very accurately using conventional sheet-metal machining techniques, such as stamping and folding, for properly maintaining the fly-height of the slider. The dimple is usually hemispherically shaped and has a large diameter so it is very difficult to define the contact point of the dimple tip to the flexure. This problem is particularly acute when a contact slider having a very low stiffness is used.

Yet another problem with conventional microactuators occurs when the vertical distance between the dimple-contact point (at the center of rotation) to the Read/Write element is relatively large, the off-track motion caused by disk tilt (usually caused by disk vibration) becomes proportionally larger. When a conventional microactuator is used, the vertical distance increases by the thickness of a microactuator. Accordingly, the off-track motion increases.

What is needed is a suspension and microactuator arrangement that overcomes the drawbacks of a conventional suspension and microactuator, such as PSA/RSA of the suspension and microactuator arrangement, dimple-contact position and electrical connections between the suspension and the microactuator.

BRIEF SUMMARY OF THE INVENTION

The present invention provides a suspension and microactuator arrangement that overcomes the drawbacks of a conventional suspension and microactuator, such as PSA/RSA of the suspension and microactuator arrangement, dimple-contact position and electrical connections between the suspension and the microactuator.

The advantages of the present invention are provided by a micro-fabricated chip having a stationary structure and a movable structure having a gimbal structure. The gimbal structure allows pitch and roll motion of the movable structure with respect to the stationary structure. One embodiment of the gimbal structure includes a dimple surface making a rolling-type contact with the stationary structure, and a center bar and a plurality of bar members. Each bar member has a first end that is attached to the center bar member and a second end that is attached to the stationary structure. An alternative embodiment of the gimbal structure includes a plurality of torsion bar members that allow the pitch and roll motion of the movable structure with respect to the stationary structure. Another alternative embodiment of the gimbal structure includes a plurality of flexible members allowing the pitch and roll motion of the movable structure with respect to the stationary structure. The micro-fabricated chip can include a limiter structure having an in-plane structure and an out-of-plane structure. The limiter structure limits movement of the movable structure away from the stationary structure by a predetermined distance. The micro-fabricated chip can be a passive chip structure or, alternatively, a microactuator having a movable structure that moves in a rotational direction or a translational direction with respect to the stationary structure.

The present invention also provides a suspension for a disk drive. The suspension includes a load beam, a micro-fabricated chip and a slider. The micro-fabricated chip has a stationary structure and a movable structure having a gimbal structure. The stationary structure is attached to the load beam and the gimbal structure allows pitch and roll motion of the movable structure with respect to the stationary structure. The slider is attached to the movable structure. One embodiment of the gimbal structure includes a dimple surface making a rolling-type contact with the stationary structure, and a center bar and a plurality of bar members. Each bar member has a first end that is attached to the center bar member and a second end that is attached to the stationary structure. An alternative embodiment of the gimbal structure includes a plurality of torsion bar members that allow the pitch and roll motion of the movable structure with respect to the stationary structure. Another alternative embodiment of the gimbal structure includes a plurality of flexible members allowing the pitch and roll motion of the movable structure with respect to the stationary structure. The micro-fabricated chip can include a limiter structure having an in-plane structure and an out-of-plane structure. The limiter structure limits movement of the movable structure away from the stationary structure by a predetermined distance. The micro-fabricated chip can be a passive chip structure or, alternatively, a microactuator having a movable structure that moves in a rotational direction or a translational direction with respect to the stationary structure.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a microactuator having a gimbal function. Thus, a microactuator according to the present invention has no microactuator substrate motion that is relative to the load beam so there is less off-track motion of a read/write element. Additionally, the structures responsible for dimple-contact position and PSA/RSA are lithographically defined and micro-fabricated, thereby making it easier to control the dimple location and PSA/RSA. Further still, the vertical distance between the dimple-contact position and the Read/Write element is less than that of a conventional microactuator by the thickness of the microactuator substrate. Consequently, the suspension can be cheaper because the suspension does not need to be designed with dimple, flexure, and PSA/RSA concerns in mind. Moreover, electrical connections to the microactuator are more easily made because the microactuator is firmly fixed onto the suspension load-beam.

Figure 1:
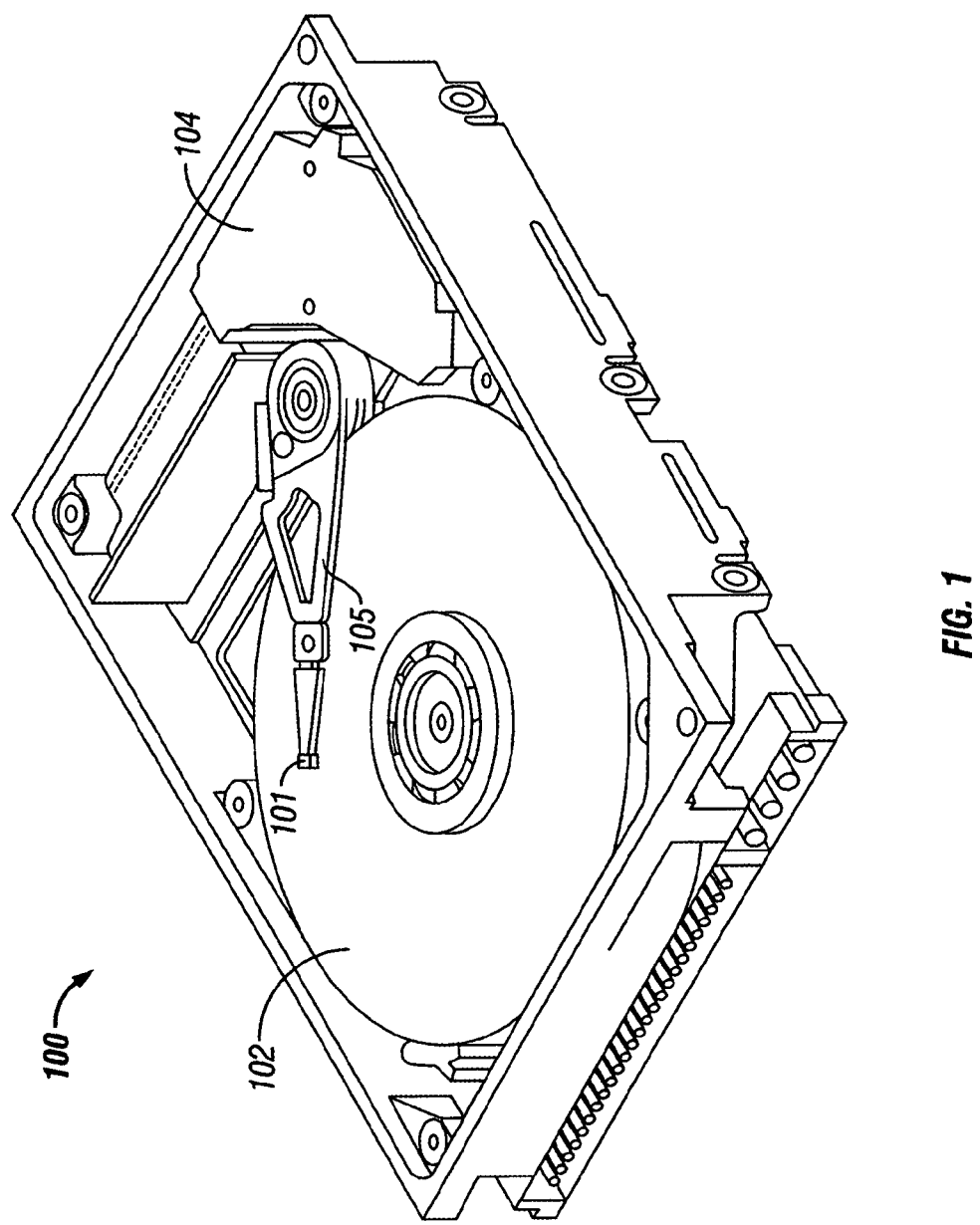
FIG. 1 shows an exemplary high-RPM disk drive having a magnetic read/write head.
Figure 2:
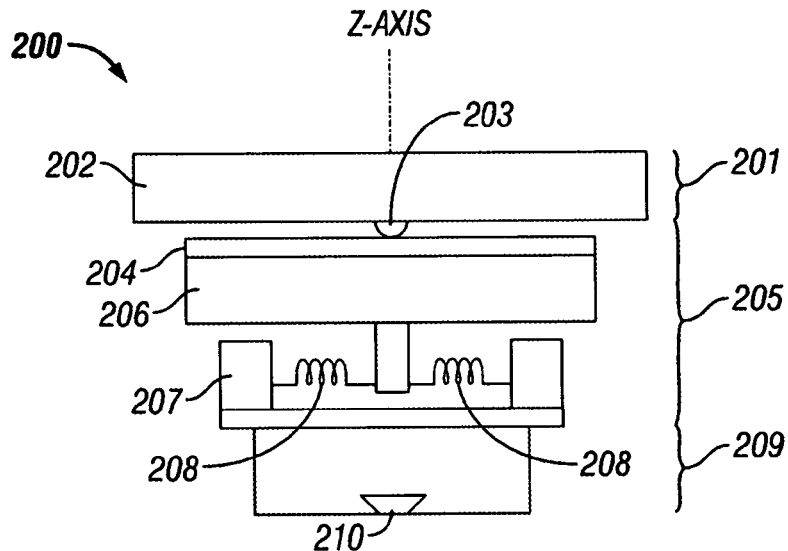
FIG. 2 depicts a conventional suspension and microactuator arrangement.
Figure 3:
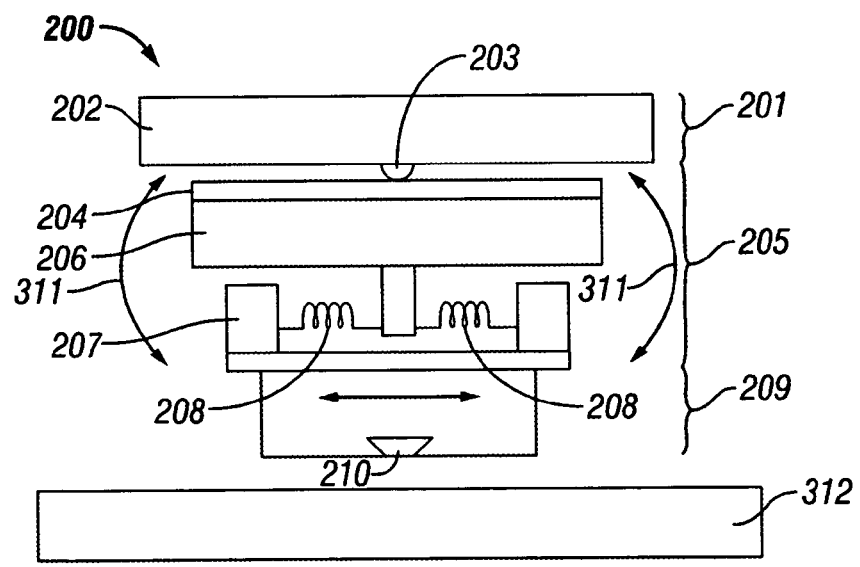
FIG. 3 depicts movement of a microactuator in roll directions under the influence of external forces as the microactuator moves over a disk.
Figure 4:
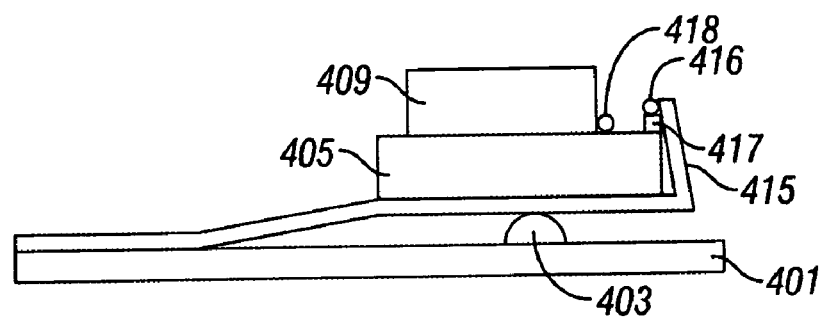
FIG. 4 depicts a conventional bent-lead connection technique for making an electrical connection between a conventional microactuator and a suspension.
Figure 5:
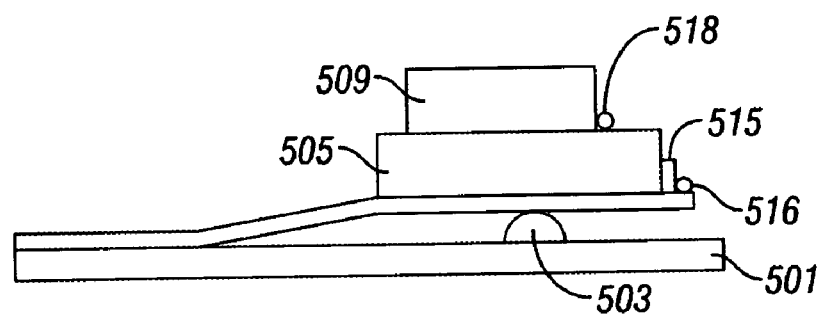
FIG. 5 depicts a conventional sidewall-bonding-pad connection technique for making an electrical connection between a conventional microactuator and a suspension.
Figure 6:
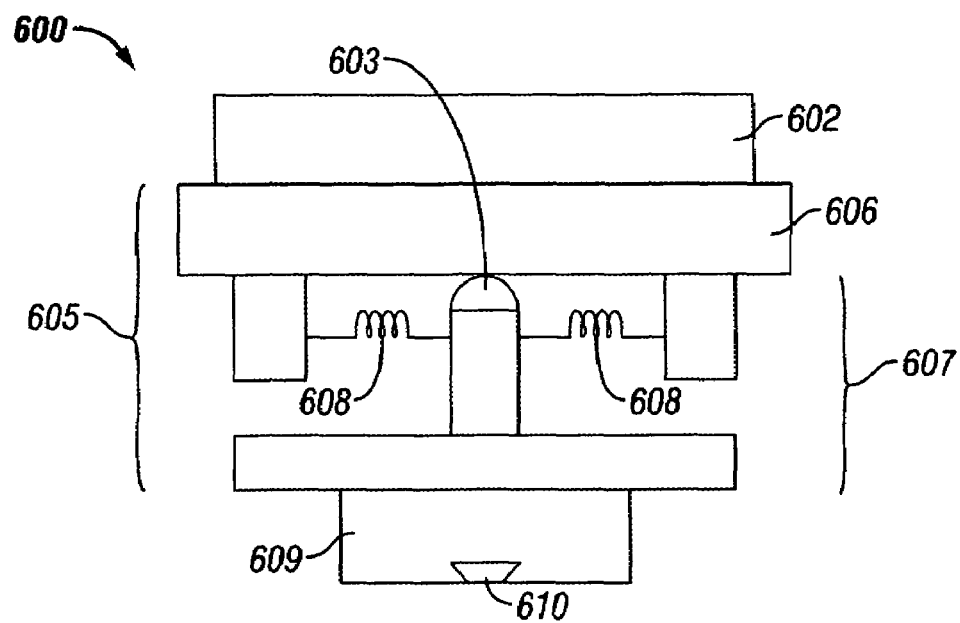
FIG. 6 depicts a microactuator arrangement according to the present invention.

FIG. 6 depicts a suspension and microactuator arrangement 600 providing a gimbal function according to the present invention. Suspension and microactuator arrangement 600 includes a suspension load beam 602, a microactuator 605 and a slider 609. Microactuator 605 includes a dimple 603, a microactuator substrate 606, a microactuator structure 607, and at least one flexure 608. Microactuator substrate 606 is the stationary structure of microactuator 605. Microactuator structure 607 is the movable structure of microactuator 605. Slider 609 includes a read/write element 610 and is identical to the sliders that are typically used in non-microactuator HDDs. The arrangement of microactuator 605 provides that the vertical distance between the contact point of dimple 603 to read/write element 601 is closer by the width of thickness of microactuator substrate 607 in comparison to conventional techniques. Consequently, suspension load beam 602 can be cheaper than conventional load beams because suspension load beam 602 does not need to be designed with dimple, flexure, and PSA/RSA concerns in mind.

Figure 7:
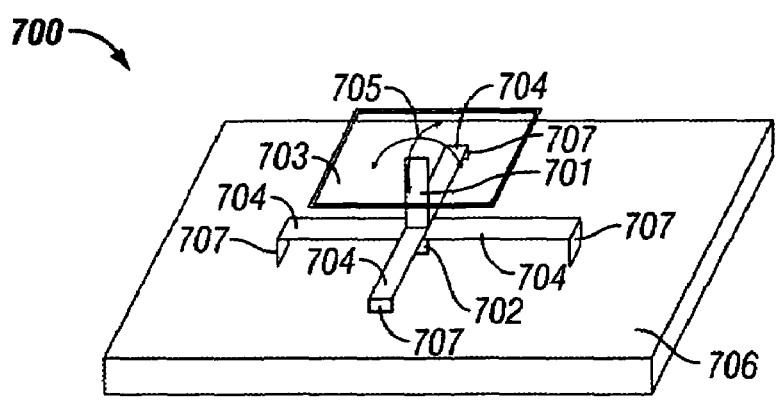
FIG. 7 depicts a first exemplary structure that provides the gimbal function of the present invention.

FIG. 7 depicts a first exemplary gimbal structure 700 that can be used for providing the gimbal function of the present invention. Gimbal structure 700 includes a vertical bar member 701 that has a dimple 702 at one end of vertical bar member 701 that contacts a microactuator substrate 706. The other end of vertical bar member 701 is attached to a slider bonding plate 703, which is attached to a slider (not shown). Dimple 702 makes a rolling-type contact with microactuator substrate 706 and allows pitch and roll motion 705. In order to hold dimple 702 in place, a plurality of horizontal bar members 704 is connected to vertical bar 701. The distal end 707 of each horizontal bar member 704 is fixed onto microactuator substrate 706. Exemplary gimbal structure 700 is lithographically defined and micro-fabricated using well-known techniques.

Figure 8:
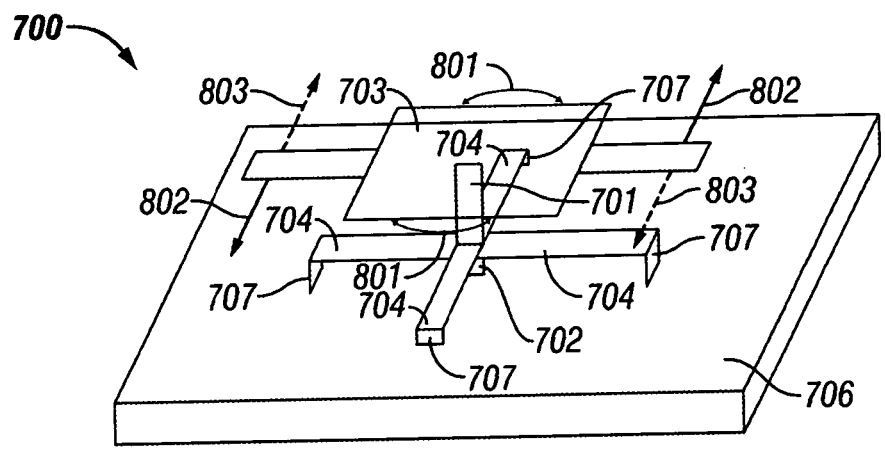
FIG. 8 depicts rotational actuation motion of the exemplary structure of FIG. 7.

FIG. 8 depicts rotational actuation motion 801 of exemplary gimbal structure 700. Counter-clockwise rotational actuation motion is accomplished by applying force 802 to slider bonding plate 803. Force 802 is generated by the microactuator (not shown in FIG. 8). Clockwise rotational actuation motion is accomplished by applying force 803 to slider bonding plate 703, which is generated by the microactuator (not shown in FIG. 8). Tabs 804 in combination with forces 802 and 803 represent the torsional forces generated by the microactuator. The rotational displacement is absorbed by vertical bar 701 acting as a torsion bar when the diameter of vertical bar 701 is properly selected.

Figure 9:
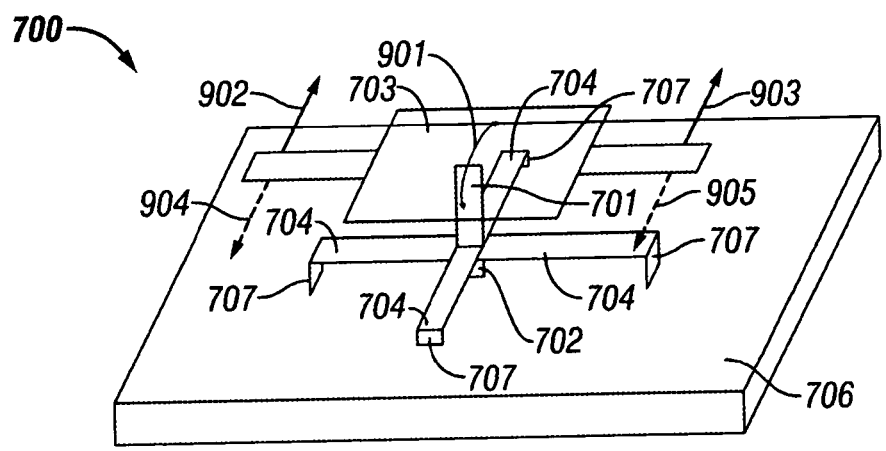
FIG. 9 depicts pitch attitude control of a slider provided by the exemplary structure of FIG. 7 according to the present invention.

FIG. 9 depicts pitch attitude control 901 of a slider provided by exemplary gimbal structure 700 according to the present invention. Two forces 902 and 903, depicted by solid lines, are generated by the microactuator (not shown in FIG. 9) and are applied to slider bonding plate 703. In response to forces 902 and 903, slider bonding plate 703 tilts and thereby changing the pitch attitude 901. Forces 904 and 905, depicted by dotted lines, change the pitch attitude of the slider in the opposite direction.

Figure 10:
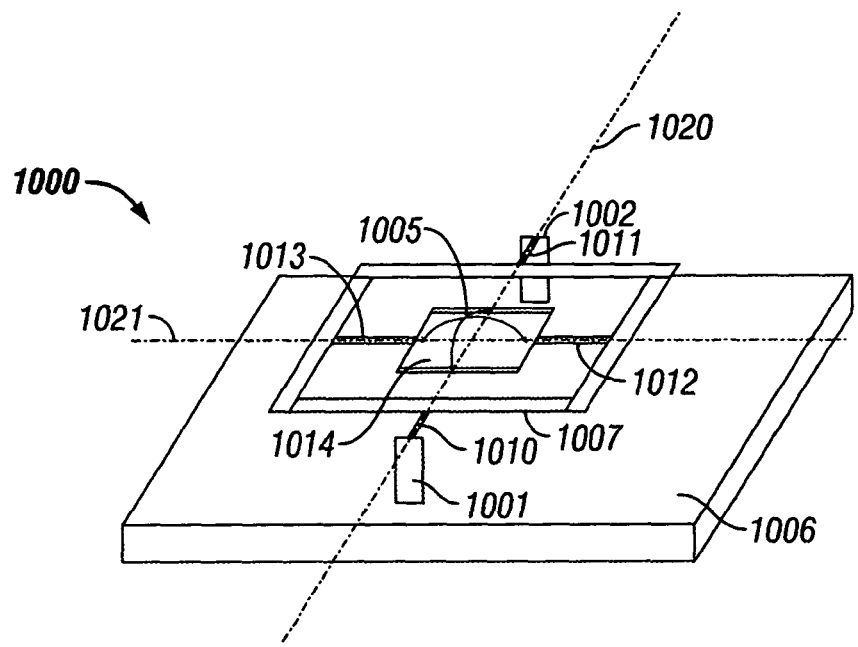
FIG. 10 depicts a second exemplary structure that provides the gimbal function of the present invention.

FIG. 10 depicts a second exemplary structure 1000 that provides the gimbal function of the present invention and allows pitch and roll motion 1005. Gimbal structure 1000 includes two vertical bar members 1001 and 1002. One end of each vertical bar member 1001 and 1002 contacts a microactuator substrate 1006. The other end of each respective vertical bar member 1001 and 1002 is attached to one end of a torsion bar member 1010 and 1011. The other end of each torsion bar member 1010 and 1011 is attached to a frame member 1007 on opposite sides of frame member 1007, thereby forming an axis of rotation 1020 around which frame member 1007 can rotate. Two more torsion bar members 1012 and 1013 are connected on opposites of frame member 1007, thereby forming a second axis of rotation 1021 that is perpendicular to axis of rotation 1020 and around which frame member 1007 can rotate. Torsion bar members 1012 and 1013 are connected to a slider bonding plate 1014. While frame member 1007 is depicted as generally square in shape, it should be understood that frame member 1007 can have any other same lending itself to having two axes of rotation. Exemplary gimbal structure 1000 is lithographically defined and micro-fabricated using well-known techniques.

Figure 11:
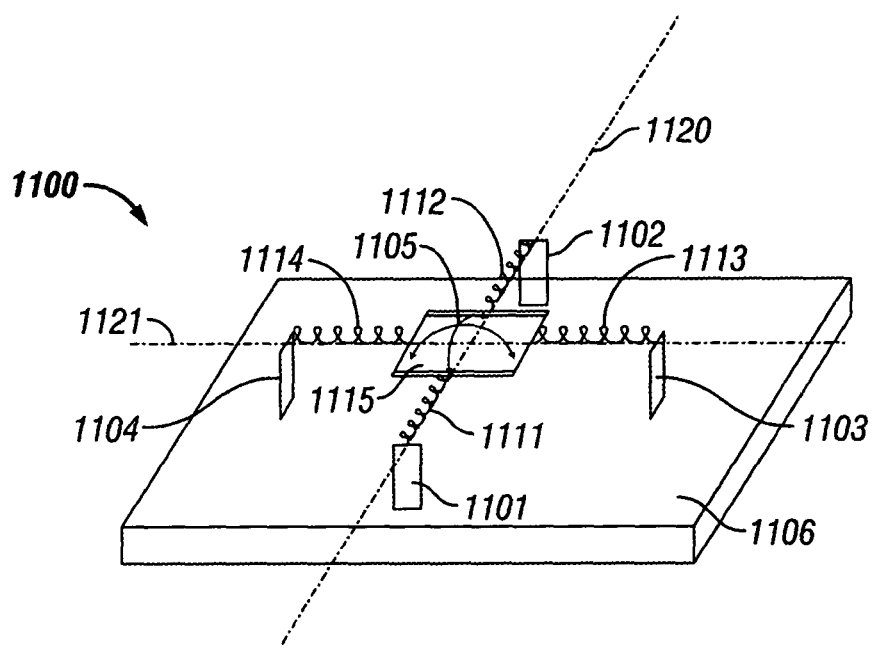
FIG. 11 depicts a third exemplary structure that provides the gimbal function of the present invention.

FIG. 11 depicts a third exemplary structure 1100 that provides the gimbal function of the present invention. Gimbal structure 1100 includes four vertical bar members 1101–1104. One end of each vertical bar member 1101–1104 contacts a microactuator substrate 1106. The other end of each respective vertical bar member 1101–1104 is attached to one end of a flexible structure, such as a spring, 1111–1114. Each flexible structure 1111–1114 is attached to a slider bonding plate 1115. Flexible structures 1111 and 1112 are connected to a slider bonding plate 1115 on opposite sides of slider bonding plate 1115, thereby forming an axis of rotation 1120 that slider bonding plate 1115 can rotate around. Torsion bars 1113 and 1114 are connected on opposites of slider bonding plate 1115, thereby forming a second axis of rotation 1121 for slider bonding plate 1115 that is perpendicular to axis of rotation 1120. Exemplary gimbal structure 1100 is lithographically defined and micro-fabricated using well-known techniques.

Figure 12:
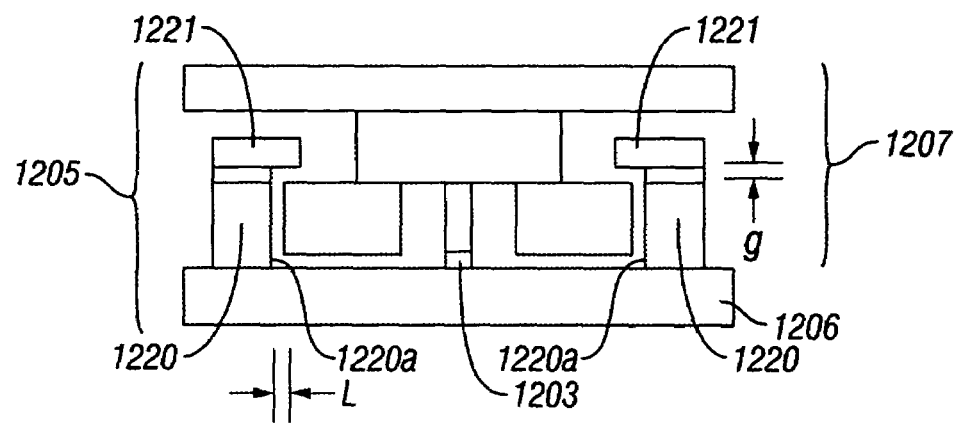
FIGS. 12–14 depict cross sectional views of an exemplary limiter structure that can be integrated with a microactuator according to the present invention.
Figure 13:
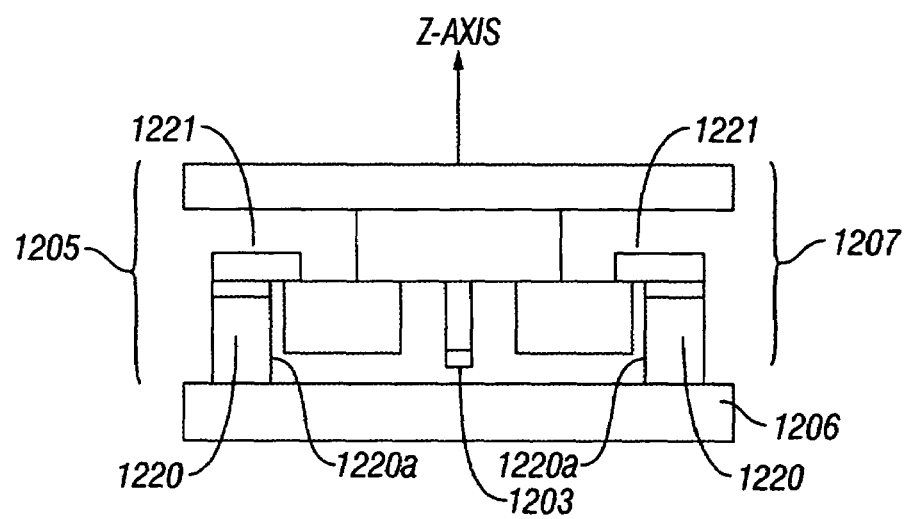
Figure 14:
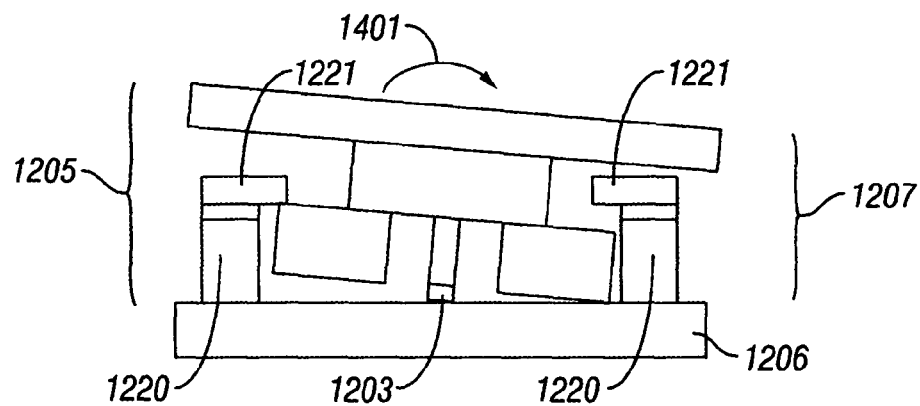

FIGS. 12–14 depict cross sectional views of an exemplary limiter structure 1220 that can be integrated with a microactuator 1205 having a gimbal structure according to the present invention. As shown in FIGS. 12–14, microactuator 1205 includes a dimple 1203, a microactuator substrate 1206 and a microactuator structure 1207. Microactuator substrate 1206 is the stationary structure of microactuator 1205. Microactuator structure 1207 is the movable structure of microactuator 1205. Limiter structure 1220 includes an out-of-plane limiter surface 1221. Each limiter structure 1220 is anchored to microactuator substrate 1206 in a well-known manner at predetermined points so that movement of microactuator structure 1207 parallel to the surface of substrate 1206 is limited to a predetermined in-plane distance L by contact with an in-plane limiter surface 1220a. Out-of-plane limiter surface 1221 extends above microactuator structure 1207 so that movement of microactuator structure 1207 away from the microactuator substrate 1206 in the z-axis direction is limited by surface 1221 to a predetermined out-of-plane distance g (shown in FIG. 12) by contact with microactuator structure 1207, as depicted by FIG. 13. Out-of-plane limiter surface 1221 also limits any tilting and rocking motion 1401 experienced by movable microactuator structure 1207, as depicted by FIG. 14.

Figure 15A:
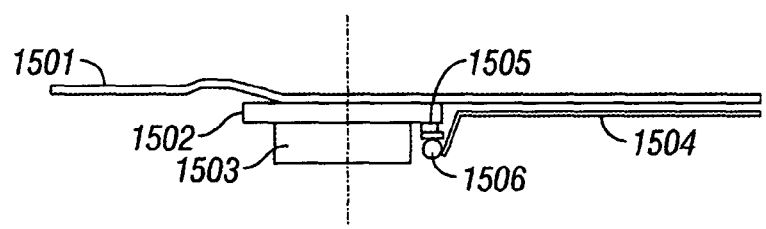
FIGS. 15a and 15b respectively are a side view and a bottom view of a slider end of a load beam using a microactuator according to the present invention.
Figure 15B:
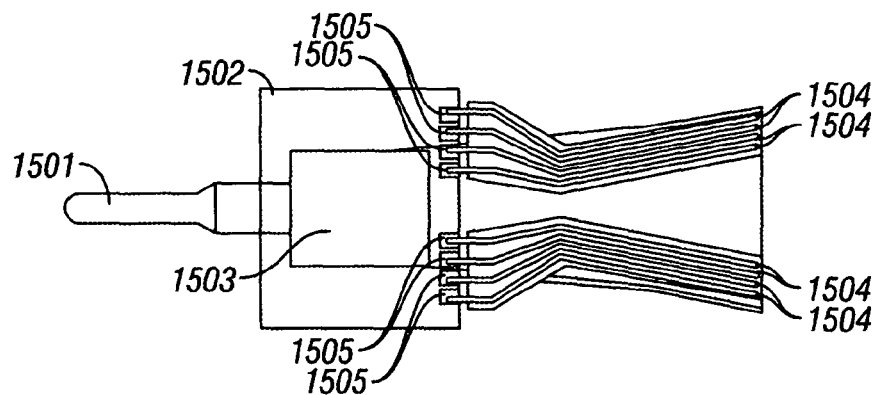

FIGS. 15a and 15b respectively are a side view and a bottom view of a slider end of a load beam 1501 using a microactuator according to the present invention. A microactuator 1502 is attached to load beam 1501. The suspension can be just a load beam because the gimbal function is provided by microactuator 1502. A slider 1503 is attached to microactuator 1502. Traces 1504 are connected to bonding pads 1505 through solder balls, of which only one solder ball 1506 is shown in FIG. 15a.

Traces for a conventional suspension are made from stainless steel/polyimide/copper laminate, in which stainless steel is used as a mechanical spring at the flexure. In contrast, the present invention uses a suspension that is not required to provide a gimbal function so that the stainless steel can be eliminated from traces 1504. Accordingly, traces 1504 can be made using inexpensive and standardly available polyimide/copper laminate having any thickness because there is no stiffness concern. Traces 1504 can be fixed onto load beam 1501 using a relatively relaxed assembly tolerance. Traces 1504 that connect to microactuator 1502 are also easily made. Connection methods, such as solder-bump reflow, ultrasonic, conductive film or adhesive techniques, can be used without worrying about affecting PSA/RSA.

Figure 16:
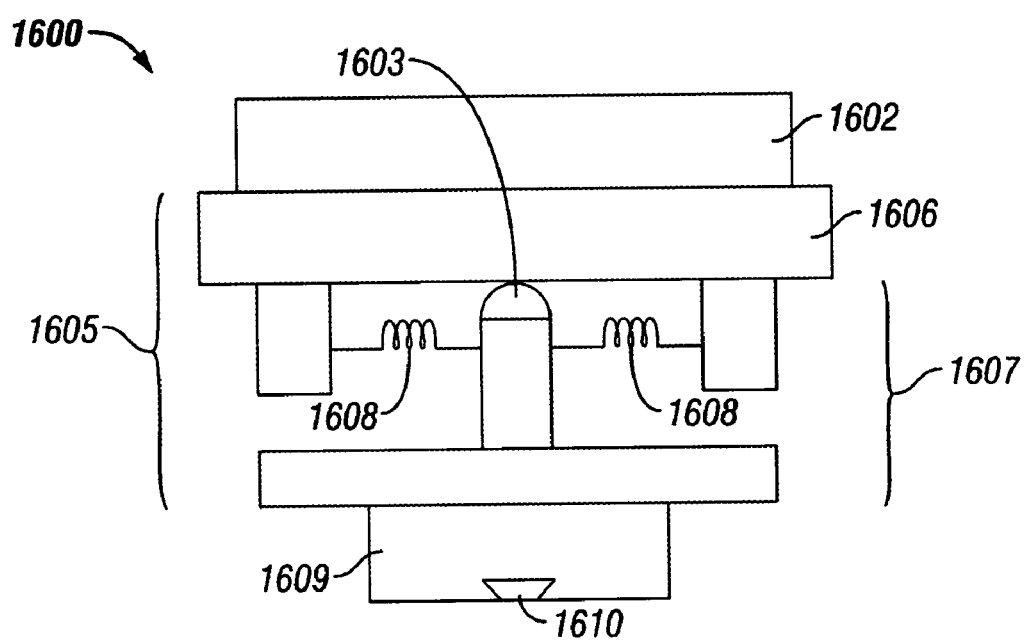
FIG. 16 depicts an alternate embodiment of an arrangement 1600 providing a gimbal function according to the present invention.

FIG. 16 depicts an alternative embodiment of an arrangement 1600 providing a gimbal function according to the present invention. Arrangement 1600 includes a suspension load beam 1602, a micro-fabricated chip 1605 and a slider 1609. Micro-fabricated chip 1605 includes a dimple 1603, a substrate 1606, a movable structure 1607, and at least one flexure 1608. Substrate 1606 is the stationary structure of chip 1605. Micro-fabricated chip 1605 does not provide an actuation function like a microactuator, but instead is passive. Slider 1609 includes a read/write element 1610 and is identical to the sliders that are typically used in non-microactuator HDDs. The arrangement of micro-fabricated chip 1605 provides that the vertical distance between the contact point of dimple 1603 to read/write element 1601 is closer by the width of thickness of movable structure 1607 in comparison to conventional techniques. Consequently, suspension load beam 1602 can be cheaper than conventional load beams because suspension load beam 1602 does not need to be designed with dimple, flexure, and PSA/RSA concerns in mind.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A micro-fabricated chip, comprising:
   a stationary structure; and
   a movable structure attached to the stationary structure, the movable structure comprising:
      a gimbal structure contacting the stationary structure;
      a microactuator structure attached to the gimbal structure and the stationary structure, the microactuator structure configured to move the gimbal structure in pitch and roll directions; and
      a slider attached to the gimbal structure such that the microactuator structure moves the movable structure and hence the slider in the pitch and roll directions with respect to the stationary structure.

2. The micro-fabricated chip according to claim 1, wherein the gimbal structure includes a dimple making a rolling-type contact with the stationary structure.

3. The micro-fabricated chip according to claim 2, wherein the movable structure moves in a rotational direction with respect to the stationary structure.

4. The micro-fabricated chip according to claim 2, wherein the movable structure moves in a translational direction with respect to the stationary structure.

5. A suspension for a disk drive, comprising:
   a load beam;
   a micro-fabricated chip comprising:
      a stationary structure attached to the load beam;
      a movable structure attached to the stationary structure, the moveable structure comprising:
         a gimbal structure contacting the stationary structure;
         a microactuator structure attached to the gimbal structure and the stationary structure, the microactuator structure configured to move the gimbal structure in pitch and roll directions; and
         a slider attached to the gimbal structure such that the microactuator structure moves the movable structure and hence the slider in the pitch and roll directions with respect to the stationary structure.

6. The suspension according to the claim 5, wherein the gimbal structure includes a dimple making a rolling-type contact with the stationary structure.

7. The suspension of claim 6 wherein the movable structure and the slider move in a rotational direction with respect to the stationary structure.

8. The suspension according to claim 6, wherein the movable structure moves in a translational direction with respect to the stationary structure.

9. A disk drive, comprising:
   a suspension having a load beam;
   a micro-fabricated chip comprising:
      a stationary structure attached to the load beam;
      a movable structure attached to the stationary structure, the moveable structure comprising:
         a gimbal structure contacting the stationary structure;
         a microactuator structure attached to the gimbal structure and the stationary structure, the microactuator structure configured to move the gimbal structure in pitch and roll directions; and
         a slider attached to the gimbal structure such that the microactuator structure moves the movable structure and hence the slider in the pitch and roll directions with respect to the stationary structure.

10. The disk drive according to claim 9, wherein the gimbal structure includes a dimple making a rolling-type contact with the stationary structure.

11. The disk drive according to claim 10, wherein the movable structure and the slider move in a rotational direction with respect to the stationary structure.

12. The disk drive according to claim 10, wherein the movable structure moves in a translational direction with respect to the stationary structure.

* * * * *